United States Patent [19]
Spencer

[11] 3,780,537
[45] Dec. 25, 1973

[54] DEVICE FOR USE AS A HOT AND COLD COMPRESS

[75] Inventor: Jacob H. Spencer, Woodbury, N.Y.

[73] Assignee: Nortech Laboratories, Inc., North Bellmore, L. I., N.Y.

[22] Filed: July 20, 1971

[21] Appl. No.: 164,368

[52] U.S. Cl................ 62/530, 128/399, 128/403, 150/2.1, 165/46
[51] Int. Cl............................................... F25d 3/08
[58] Field of Search................ 62/530; 165/46; 128/399, 403; 150/2.1

[56] References Cited
UNITED STATES PATENTS

| | | | |
|---|---|---|---|
| 2,203,591 | 6/1940 | Brown | 62/530 |
| 2,378,087 | 6/1945 | Kearney | 62/530 |
| 2,515,582 | 7/1950 | Beckwith | 62/530 |
| 2,697,424 | 12/1954 | Harma | 62/530 |
| 2,595,328 | 5/1952 | Bowen | 62/530 |
| 2,803,115 | 8/1957 | Shepherd | 62/530 |
| 3,075,529 | 1/1963 | Young | 128/403 |
| 3,545,230 | 12/1970 | Morse | 62/530 |

Primary Examiner—William J. Wye
Attorney—Albert C. Nolte et al.

[57] ABSTRACT

A device for use as a hot and cold compress comprises a tough flexible envelope of plastic material within which is a gel which maintains a gel-like consistency over a wide temperature range.

6 Claims, 2 Drawing Figures

PATENTED DEC 25 1973   3,780,537

INVENTOR

BY  *Nolte & Nolte*
ATTORNEYS

DEVICE FOR USE AS A HOT AND COLD COMPRESS

This invention is concerned with a device for use as a hot and cold compress and one which is reusable.

Existing devices to these ends have generally comprised ice bags or poultices. The ice bag has the drawback that it is messy and that it does not closely and comfortably conform to the part of the body to which it is to be applied because of rhe rigid contents of the bag. Poultices such as kaolin poultices are of course notoriously messy and they are not reusable.

the present invention seeks to provide a device which can be used optionally as a hot or as a cold compress, one which is reusable and which will closely and confortably conform to the part of the body to which it is to be applied and one of which the preparation and use is simple and clean.

According to one aspect of this invention there is provided a tough envelope containing a liquid or paste or gel which has a low freezing point and a high boiling point. Preferably the liquid is a gel which maintains its gel-like consistency over a wide temperature range.

In a preferred form the gel is formulated from water and glycerine with a thickening agent. A neutralizer may be added such as sodium hydroxide and desirably an additive is used to inhibit the growth of fungus. That additive may for example be methyl paraben.

It is convenient to form the envelope of the device of a polyethylene which is both flexible and tear and puncture resistant.

Reference is made to the accompanying drawings in which.

Figure 1:
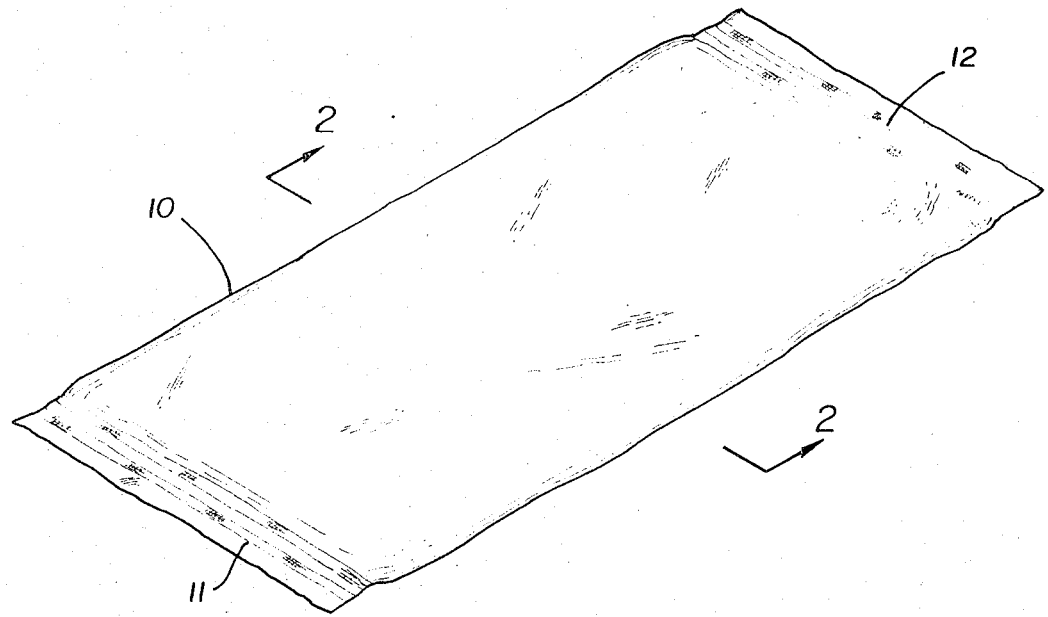
FIG. 1 is a perspective view of the device of this invention.
Figure 2:
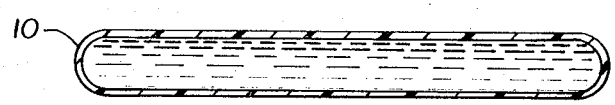
FIG. 2 is a section on the line 2—2.

In the drawing the device comprises a generally rectangular envelope 10 which is sealed at its opposite ends 11 and 12 in conventional fashion to enclose a quantity of a gel-like material which fills the envelope sufficiently to enable that envelope to be closely conformed to the body.

In use the envelope would be put into a freezer or other chilling device for use as a cold compress or would be put into hot water to be used as a hot compress. The material within the envelope is a gel which will maintain its gel-like consistency over a range of temperatures from about 0°F. to about 212°F.

A particularly desirable gel is formed as follows. To produce about 400 pounds of gel, 235.5 pounds of water, 160 pounds of glycerine, 240 grams of methyl paraben, 11 grams of peacock blue (a water soluble dye), 4 pounds of Carbopol (a BF Goodrich Chemical Co. trademark for a thickening agent), and 180 grams of sodium hydroxide are mixed according to the following method:

200 lbs of water is placed in a 55 gallon drum and agitated at high speed during the rapid introduction of four lbs of Carbopol. The agitation is maintained until all the Carbopol is dispersed.

Methyl paraben, an antiseptic and fungus growth inhibitant, is dispersed in 2.5 lbs of hot water and is added to the mixed water and Carbopol as agitation continues.

The glycerine is then added and the dye dissolved in 2.5 lbs of water and added to the mixture slowly.

Agitation is continued for about an hour or until all the particles are dissolved.

The sodium Hydroxide is then mixed in 25.5 lbs of water and is dissolved completely and added rapidly to the mixture. The mixture is then stirred slowly until the product is completely gelled.

The water and glycerine base of the mix is used because the glycerine tends to lower the freezing point of the water and is readily miscible with the water. The methyl paraben inhibits the growth of mold and the Carbopol thickens the mixture.

Because Carbopol is acid, sodium hydroxide is added as a neutralizer. The dye is added to give to the resultant gel a pleasant appearance.

It is to be noted that the gel is nontoxic and that it will maintain its consistency over a fairly wide temperature which will facilitate its use as a hot and a cold compress.

What is claimed is:

1. A hot and cold compress comprising a tough flexible sealed envelope, and a neutral gel within said envelope, said gel being comprised of a mixture of water, glycerine a thickening agent and a neutralizing agent, the relative weight proportions of the water and the glycerine being about 235.5 parts of the water to about 160 parts of the glycerine, said gel maintaining its gel-like consistency over a temperature range of about 0° F. to about 212° F.

2. The compress of claim 1 wherein said thickening agent is acidic and said neutralizing agent is basic.

3. The compress of claim 2 wherein said neutralizing agent is sodium hydroxide.

4. The compress of claim 3 wherein said thickening agent consists of about four parts by weight of Carbopol, and said neutralizing agent consists of about 0.03 parts by weight of sodium hydroxide.

5. The compress of claim 3 wherein said neutral gel further comprises a mold growth inhibiting agent.

6. The compress of claim 5 wherein said mold growth inhibiting agent consists of about 0.64 parts by weight of methyl paraben.

* * * * *